United States Patent
Lee

(10) Patent No.: US 6,741,561 B1
(45) Date of Patent: May 25, 2004

(54) ROUTING MECHANISM USING INTENTION PACKETS IN A HIERARCHY OR NETWORKS

(75) Inventor: Whay S. Lee, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 784 days.

(21) Appl. No.: 09/624,856

(22) Filed: Jul. 25, 2000

(51) Int. Cl.[7] ............................................. H04L 12/56
(52) U.S. Cl. ...................................... 370/230; 370/235
(58) Field of Search ................................ 370/242, 244, 370/229, 230; 714/48, 748, 749

(56) References Cited

U.S. PATENT DOCUMENTS

| | | |
|---|---|---|
| 5,689,646 A | 11/1997 | Thorson |
| 5,689,661 A | 11/1997 | Hayashi et al. |
| 5,701,416 A | 12/1997 | Thorson et al. |
| 5,720,025 A | 2/1998 | Wilkes et al. |
| 5,737,628 A | 4/1998 | Birrittella et al. |
| 5,970,232 A | 10/1999 | Passint et al. |
| 6,016,510 A | 1/2000 | Quattromani et al. |
| 6,023,753 A | 2/2000 | Pechanek et al. |
| 6,055,618 A | 4/2000 | Thorson |
| 6,101,181 A | 8/2000 | Passint et al. |
| 6,167,502 A | 12/2000 | Pechanek et al. |
| 6,330,435 B1 * | 12/2001 | Lazaraq et al. ............ 455/412 |
| 6,567,378 B1 * | 5/2003 | Yuan et al. ................. 370/235 |

FOREIGN PATENT DOCUMENTS

| | | |
|---|---|---|
| EP | 0 785 512 | 7/1997 |
| WO | 99/26429 | 5/1999 |

OTHER PUBLICATIONS

Bradley Kuszmaul, Mercury Computer Systems, Inc., "The RACE Network Architecture," (posted at www.mc.com/techlit/#tech_brief prior to this), 6 pages.

(List continued on next page.)

*Primary Examiner*—Kenneth Vanderpuye
(74) *Attorney, Agent, or Firm*—Robert C. Kowert; Meyertons, Hood, Kivlin, Kowert & Goetzel, P.C.

(57) ABSTRACT

A routing scheme using intention packets is contemplated. At times, one or more switching devices within a network may become overloaded with traffic or may encounter other adverse transmission conditions. When this occurs, a switching device may drop one or more packets to alleviate some of the congestion or other adverse condition. The switching devices may support a particular amount of resources (e.g. bandwidth, buffers, etc.) in and out of each of their ports. When a packet or a header portion of a packet arrives at a switching device, the switching device may determine what port the packet will need and the amount resources required by the packet on that port. If the required resources available for the packet on the port, then the switching device may route the packet to a next device. If the required resources are not available for the packet on the port, then the switching device may drop at least a portion of the packet. As opposed to or in addition to congestion (e.g. insufficient resources), other adverse conditions may be detected. When a packet is dropped, the switching device that dropped it may create an intention packet that corresponds to the dropped packet and route the intention packet to the destination device specified by the dropped packet. The destination device may send a packet to the sending device to resend the request and may perform an operation corresponding to the intention packet in anticipation of receiving a resent request.

22 Claims, 8 Drawing Sheets

OTHER PUBLICATIONS

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD–98–1031, 16 pages.

Prasant Mohapatra, Wormhole Routing Techniques for Directly Connected Multicomputer Systems, ACM Computing Surveys, vol. 30, No. 3, Sep. 1998, 37 pages.

Christopher Glass and Lionel Ni, "The Turn Model for Adaptive Routing," Journal of the Association for Computing Machinery, vol. 41, No. 5, Sep. 1994, pp. 874–902.

Reddy, Dept. of Computer & Information Sciences, "A Dynamically Reconfigurable WDM LAN Based on Reconfigurable Circulant Graph," IEEE, 1996, 4 pages.

Funahashi, Jouraku and Amano, "Adaptive Routing for Recursive Diagonal Torus," Transactions of the Institute of Electronics, Information and Communication Engineers D–I, vol. J83D–I, No. 11, Nov. 2000, pp. 1143–1153.

Milan Kovacevic, Center for Telecommunications Research, "On Torus Topologies with Random Extra Links," IEEE 1996, pp. 410–418.

Dally, et al., The Torus Routing Chip, Distributed Computing, Springer–Verlag 1986, pp. 187–196.

Susan Hinrichs, "A Compile Time Model for Composing Parallel Programs,"IEEE Parallel and Distributed Technology, 1995, 19 pages.

"CRAY T3D System Architecture Overview Manual," ftp://ftp.cray.com/product–info/mpp/T3D_Architecture_Over/T3D.overview.html, Cray Research, 1993, 40 pages.

Marco Fillo, et al., "The M–Machine Mulitcomputer," Laboratory for Computer Science, Massachusetts Institute of Technology, A.I. Memo No. 1532, Ann Arbor,. Mar. 1995, 14 pages.

Noakes, et al., "The J–Machine Multicomputer: An Architectural Evaluation," Proceedings of the $20^{th}$ International Symposium on Computer Architecture, May 1993, 12 pages.

Dally, et al., "Architecture of a Message–Driven Processor," International Conference on Computer Architecture, Jun. 1987, pp. 189–196.

Dennison, Lee and Dally, "High–Performance Bidirectional Signalling in VLSI," Massachusetts Institute of Technology, Oct. 12, 1992, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al., "The Reliable Router: A Reliable and High–Performance Communication Substrate for Parallel Computers," Proceedings of the First International Parallel Computer Routing and Communication Workshop, Seattle WA, May 1994, 15 pages.

Dennison, et al., "Low–Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, April 18, 1991, 79 pages.

Thucydides Xanthopoulos, "Fault Tolerant Adaptive Routing in Multicomputer Networks,"Dept. of Electrical Engineering and Computer Science, Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes,"F. Thomson Leighton, Morgan Kaufmann Publishers, 1992, pp. 1–831.

Christopher J. Glass and Lionel Ni, "Fault–Tolerant Wormhole Routing in Meshes," Technical Report, MSU–CPS–ACS–72, Oct. 30, 1992 (revised May 25, 1993), 28 pages.

Stefan Savage and John Wilkes, "AFRAID–A Frequently Redundant Array of Independent Disks," Proceedings of the 1996 USENIX Technical Conference, pp. 27–39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU–CPS–ACS–44, Oct. 10, 1991 (revised Mar. 2, 1992), pp. 278–287 (numbered herein as 1–20).

Thomas Stricker, "Message Routing on Irregular 2D–Meshes and Tori," School of Computer Science, Carnegie Mellon Univ., Jan. 15, 1991, pp. 170–177 (numbered herein as 1–19).

Dally, et al., "The J–Machine: A Restrospective," in 25 Years of the International Symposia on Computer Architecture—Selected Papers. Pp. 54–58.

\* cited by examiner

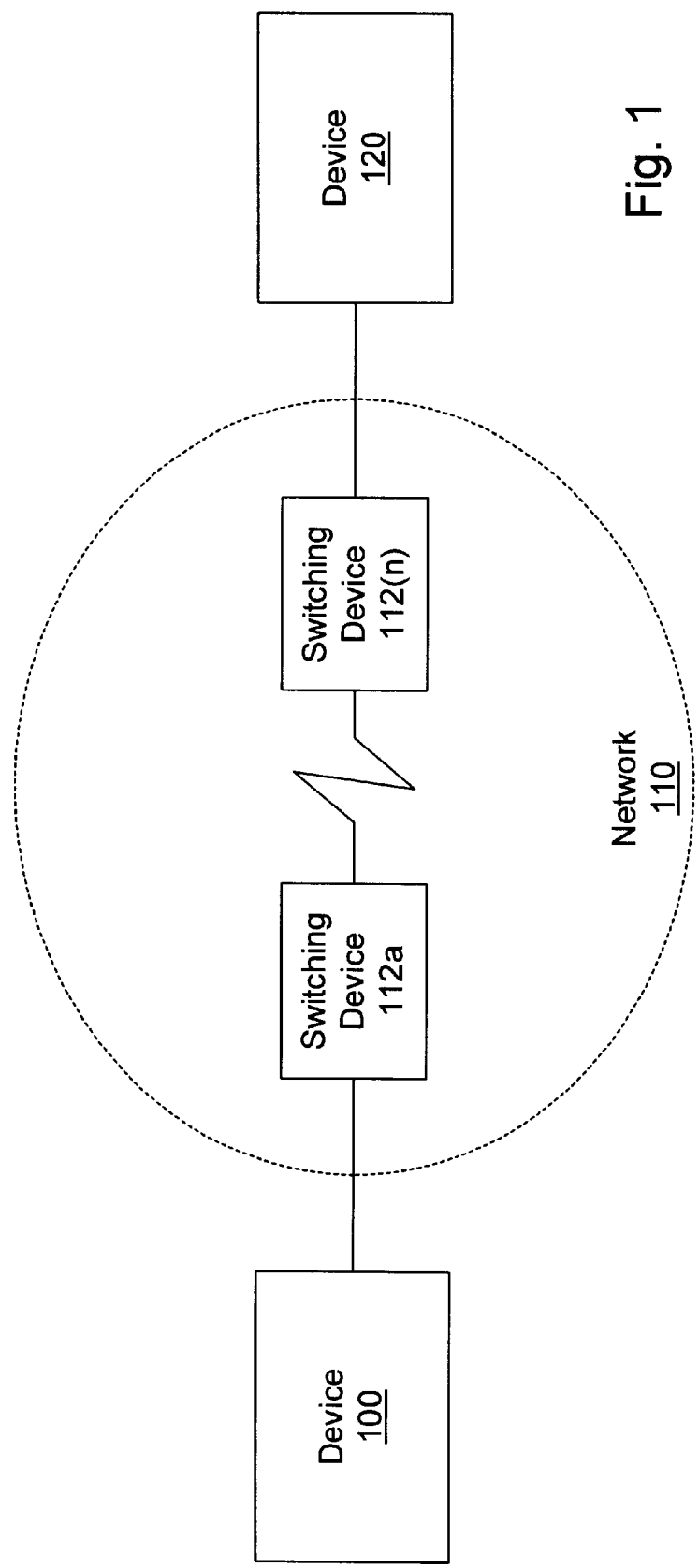

ROUTING MECHANISM USING INTENTION PACKETS IN A HIERARCHY OR NETWORKS

BACKGROUND OF THE INVENTION

1. Cross-Reference to Related Application

This application relates to co-pending U.S. patent application, Ser. No. 09/624,850, filed on the same day as the present application and entitled "System and Method for Implementing a Routing Scheme in a Computer Network Using Intention Packets When Fault Conditions Are Detected" by Whay S. Lee, which is incorporated herein by reference in its entirety, and to co-pending U.S. patent application, Ser. No. 09/625,381, filed on the same day as the present application and entitled "System and Method for Implementing a Routing Scheme Using Intention Packets in a Computer Network" by Whay S. Lee, which is incorporated herein by reference in its entirety.

2. Field of the Invention

This invention relates generally to the field of computer systems and, more particularly to communications protocols within computer systems and/or networks, and communication routing or switching within computer systems and/or networks.

3. Description of the Related Art

Devices in a communications network may communicate with one another by sending packets to each other. These packets may correspond to an operation that one device seeks to perform with the assistance of another device. Packets may be transferred between devices using a network which may include a fabric. A network generally may comprise a number of devices that are configured to convey packets between any number of devices.

At times, however, adverse transmission conditions may occur in the network when one device is sending a packet to another device on the network. For example, the network may become overly congested with packets traveling between devices. Another adverse condition that may occur in networks is corruption of a packet (e.g. an ECC error, parity error, checksum error, etc.). A fault condition (e.g. failure in the fabric) that prevents a packet from proceeding along its proposed route is another adverse condition. One adverse condition resolution scheme in packet routing protocols involves dropping packets in response to an adverse transmission condition within one or more devices (e.g. a switch, router, endpoint, node, etc.) in the network. In the case of congestion, a device within the network may drop one or more packets randomly or selectively to instantaneously reduce the packet load. By dropping one or more packets, the device can free up sufficient resources to service the remaining packets. Corrupted packets may also be dropped. For a fault condition, all packets reaching a fault point may have to be dropped and resent using a different route.

When a packet is dropped, the device that originated the packet needs to detect that it has been dropped so that it can be resent. Detection of dropped packets may be accomplished by a time-out mechanism at a receiving device when it fails to receive an expected packet, by a time-out mechanism at a sending device where the sending device is waiting for a signal from a receiving device that a packet has been received, or by sending a negative acknowledgement (NACK) from the device that dropped the packet to the sending device.

Each of these detection methods has its problems, however. Where a time-out mechanism is used, a device needs to ensure that it does not resend a packet until it is certain that the original packet has been dropped. The device must generally wait a period of time to ensure that the packet has been dropped and this waiting period results in a performance penalty. Where a NACK to the sending device is used to signal a dropped packet, a dropped packet is unknown to the receiving device, no matter how far through the network the dropped packet traveled before being dropped. The NACK propagates back only to the sender and the network resources consumed by the dropped packet are wasted. An apparatus and method of handling adverse transmission conditions that minimizes the drawbacks of the above methods is needed.

SUMMARY

The problems outlined above may be solved by the use of the apparatus and method described herein. Generally speaking, an apparatus and method for implementing a routing scheme using intention packets is contemplated for a hierarchy of network topologies. At times, a switching device within a network level of a network hierarchy may detect an adverse transmission condition such as a fault, corruption, or congestion. When a switching device detects an adverse transmission condition, it may drop one or more packets to alleviate the adverse condition.

For example, in the case of congestion, the switching devices may support a particular amount of routing resource (e.g. bandwidth) in and out of each of their ports. When a packet or a header portion of a packet arrives at a switching device, the switching device may determine what port the packet will need and the amount of resources required by the packet on that port. If the required resources are available for the packet ion the port, then the switching device may route the packet to a next device. If the required resources are not available for the packet on the port, then the switching device may drop at least a portion of the packet. A switching device may be configured to remember the amount of resources that it has committed to other traffic and may drop a subsequent packet when it is unable to guarantee the resources requested by the subsequent packet.

When a packet is dropped due to an adverse transmission condition, the switching device that dropped it may create a second packet to be forward to the destination device. The second packet may be an intention packet that corresponds to the dropped packet. The switching device may then route or forward the intention packet to the destination device specified by the dropped packet. The intention packet may be much smaller than the dropped packet and may include a header portion or part of a header portion of the dropped packet, as discussed below. Accordingly, it may require substantially less bandwidth than the dropped packet so that a switching device may be able to guarantee its delivery to the next device if congestion was encounter. For fault conditions, the device may send the intention packet to the destination using a different route in order to avoid the fault condition.

A device may react to receiving an intention packet based on the information in the intention packet as well as its own characteristics. The information in the intention packet may indicate whether the dropped packet was a request or a response to a request. If the dropped packet was a request, then the device that receives the intention packet, i.e. the receiving device, may send a signal to the requesting device that its request has been dropped. The receiving device may also perform an operation that corresponds to the request in anticipation of receiving the resent packet. If the dropped packet was a response to a request, then the requesting device will receive the intention packet. The requesting device may reschedule the request in response to receiving the intention packet and may convey a subsequent packet that includes the request to the receiving device. The requesting device may be configured optimize the resending of the request by rescheduling the request for a more appropriate time or by merging the request with a subsequent request.

In a hierarchical network system, the routing mechanism employing intention packets may be applied to one or more network levels of the hierarchy. A common device may be coupled to two or more levels of the hierarchy. A switching device in a first level of the network hierarchy may receive a first packet from a first device in the first level. The switching device may determine if an adverse transmission condition is present. If an adverse transmission condition is present in the first network level, the switching device may drop at least part of the first packet and generate, a second packet including information about the first packet. The second packet may be conveyed to a second device. If an adverse transmission condition is not present in the first network level, the first packet is conveyed to the second device. The second device may convey a third packet onto a second network level. If an adverse transmission condition is present in the second network, at least part of said third packet may be dropped, and a fourth packet including information about the third packet may be conveyed to a third device on the second network level. The third packet may have been conveyed on the second network level in response to the second device receiving the first or second packet. The second and fourth packets may be intention packets.

BRIEF DESCRIPTION OF THE DRAWINGS

FIG. 1 is a block diagram illustrating one embodiment of devices connected through a network.

Figure 2A:
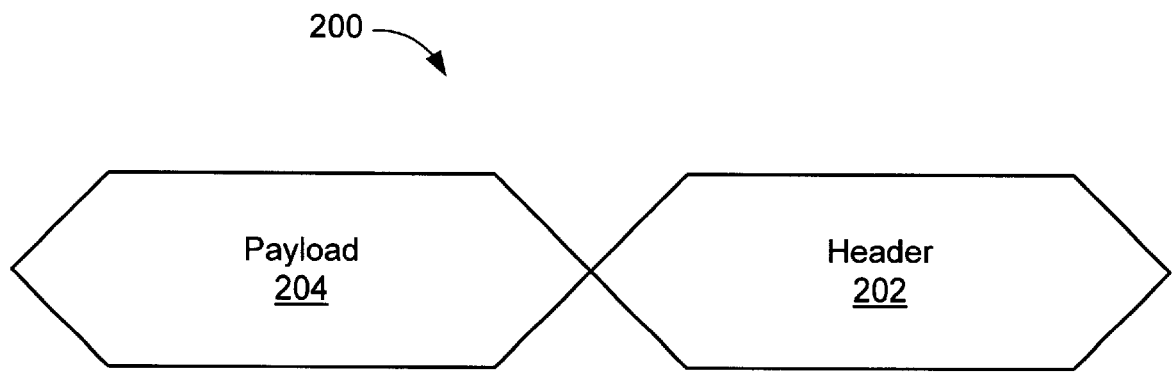
FIG. 2a is a block diagram illustrating one embodiment of a packet.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF AN EMBODIMENT

Turning now to FIG. 1, a block diagram illustrating one embodiment of devices connected through a network. FIG. 1 depicts device 100 coupled to device 120 through network 110. Network 110 includes switching devices 112a through 112(n). It can be noted that any number, n, of switching devices may be included in network 110 and that the switching devices may be connected in any manner. It can be noted that device 100 and device 120 can comprise any type of devices configured to communicate with other devices. In one particular embodiment, device 100 may comprise a computer system host interface to a storage system and device 120 may comprise a disk drive. Alternatively, devices 100 and 120 may be any combination of networked devices, such as client computers, servers, storage devices, etc. Network 110 may be a network on any scale, such as from the Internet, to a LAN or a network inside a single system interconnecting multiple disk drives or other I/O devices. In an Internet embodiment, device 100 may be a requester of a web page and device 120 may be a web server.

Devices 100 and 120 may be configured to communicate through network 110. Device 100 may convey a request to switching device 112a. The request may be routed or transmitted through network 110 until it is received at switching device 112(n) and ultimately at device 120. Device 120, depending on the request, may convey a response to the request to switching device 112(n). The response may be routed through network 110 until it is received at switching device 112a and ultimately at device 120. In one embodiment, switching devices 112 are simple switches that include at least one input port, one output port, and operate to pass data from an input port to an output port. In other embodiments, switching devices 112 may be more intelligent devices such as packet routers or computer systems.

Generally speaking, a request may be a signal from a first device to a second device for the second device to perform an operation or operations. For example, a request may signal a device to read data from or write data to a particular location. A response may be a signal from the second device to the first device that corresponds to the request. A response, for example, may indicate whether or not the operation signaled by the request was performed successfully or may convey data corresponding to the request. In one embodiment, requests and responses may be conveyed using packets defined by a communications protocol. Devices 100 and 120 may be configured to convert their respective requests and responses into packets prior to conveying the packets to network 110.

The switching devices in network 110 may implement a transmission scheme using intention packets. At times, a switching device 112 within a network 110 may detect an adverse transmission condition such as a fault, corruption, or congestion. When a switching device 112 detects an adverse transmission condition, it may drop one or more packets to alleviate the adverse condition.

Switching devices 112a through 112(n) may each include one or more ports. The switching devices may support a particular bandwidth (and/or other routing resources) in and out of each of their ports. When a packet or a header portion of a packet arrives at a switching device, the switching device may determine what port the packet will need and the amount of routing resources required by the packet on that port. If the required routing resources are available for the packet on the port, e.g. the required resources are less than or equal to the available resources, then the switching device may route the packet to a next device. If the required resources are not available for the packet on the port, then the switching device may drop at least a portion of the packet. A switching device may be configured to remember the amount of routing resources that it has committed to other traffic, i.e. other packets, and may drop a subsequent packet when it is unable to guarantee the resources requested by the subsequent packet. A switching device may also drop corrupted packets, e.g. packets with a ECC, parity, or checksum error. A switching device may also drop packets for other adverse conditions such as a fault condition that prevents a packet from being routed along its proposed route.

When a packet is dropped, the switching device that dropped it may create an intention packet that corresponds to the dropped packet. The switching device may then route the intention packet to the destination device specified by the dropped packet. The intention packet may be much smaller than the dropped packet and may include a header portion or part of a header portion of the dropped packet, as discussed below. Accordingly, it may require substantially less routing resources than the dropped packet so that a switching device may be able to guarantee its delivery to the next device. In some cases, such as fault conditions, alternate paths may have to be tried for the intention packet to reach its destination.

FIG. 2a illustrates one embodiment of a packet 200 that may be used in the embodiment of FIG. 1. Packet 200 may include a header 202 and a payload 204. Header 202 may include sequencing and network routing information, indicators of the source and destination devices, an address corresponding to a beginning data block, and an indicator of the number of data blocks involved in the request that corresponds to the packet. Payload 204 may include one or more data blocks being transferred by packet 200. The number of data blocks in payload 204 may be variable or fixed according to a given communications protocol. It can be noted that payload 204 may be empty (or absent) for certain types of packets. Header 202 and/or payload 204 may include other information as required by a protocol.

In one embodiment, network 110 may implement a bandwidth-reserving wormhole routing model. In this model, header 202 may travel ahead of its corresponding, variable-size payload 204 in network 110. As the header routes from switching device to switching device in network 110, it may reserve bandwidth (and/or other resources) for its payload 204 at each subsequent switching device. Once the resource are reserved in a switching device, the switching device can assure that payload 204 will route successfully to the next switching device. If a switching device along the way cannot provide the required resources for payload 204, then that switching device may be configured to drop payload 204 and generate an intention packet as discussed above. In this embodiment, the switching device may generate the intention packet using header 202 or part of header 202.

Figure 2B:
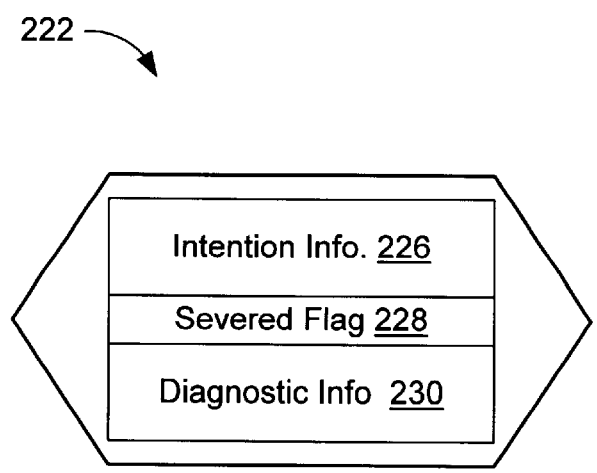
FIG. 2b is a block diagram illustrating one embodiment of a packet.

FIG. 2b illustrates one embodiment of an intention packet 222. Intention packet 222 may include intention information 226, severed flag 228 and diagnostic information 230. In one embodiment, intention information 226 may include the information of header 202 of the dropped packet. In other embodiments, intention information 226 may include only selected or modified portions of header 202 of the dropped packet. Severed flag 228 may include an indicator that the intention packet corresponds to a dropped packet. Diagnostic information 230 may include a switch indicator which may identify the switching device where the original packet was dropped. Diagnostic information 230 may include congestion statistics which may include congestion information of the switching device where the original packet was dropped. The intention packet may be generated by the device using software, hardware or a combination thereof.

Once a switching device generates intention packet 222, the switching device may convey intention packet 222 to the destination device through network 110. Since intention packet 222 may comprise a small packet, it may be assured (or nearly assured) of routing through the subsequent switching devices in network 110 to reach its destination device if congestion was the adverse condition. The switching devices may be configured to insure that they always have the required bandwidth or resources to route packets up to a maximum size. The intention packets may be below this maximum size such that the switching devices may always route them.

A device may react to receiving an intention packet based on the information in the intention packet as well as its own characteristics. The information in the intention packet may indicate whether the dropped packet was a request or a response to a request. If the dropped packet was a request, then the device that receives the intention packet, i.e. the receiving device, may send a signal to the requesting device that its request has been dropped. This signal may be a NACK packet conveyed from the receiving device so that the requesting device may resend the dropped packet. The receiving device may also perform an operation that corresponds to the request in anticipation of receiving the resent packet as discussed below in more detail.

If the dropped packet was a response to a request, then the requesting device will receive the intention packet. The requesting device may reschedule the request in response to receiving the intention packet and may convey a subsequent packet that includes the request to the receiving device. The requesting device may be configured to optimize the resending of the request by rescheduling the request for a more appropriate time or by merging the request with a subsequent request.

In one particular embodiment of FIG. 1, device 100 may comprise a host interface device that is coupled to a computer bus or network (not shown) and device 120 may comprise a disk drive. In this embodiment, the host interface device may perform read and write accesses to the disk drive on behalf of devices in the computer network. The cases of a write request and a read request with the host interface and disk drive will now be discussed to illustrate the use of intention packets in a congested network.

In order to perform a write request, the host interface may convey a packet to the disk drive through network 110. The packet may include a header with information about the write request and a payload that includes one or more data blocks to be written. If each switching device encountered by the packet has sufficient bandwidth to transmit the packet, then the packet can be routed to the disk drive where the disk drive can perform a write operation corresponding to the write request. Depending on the communications protocol employed by the system, the disk drive may convey a packet back to the host interface to indicate that the write request was successful after completing the write operation.

If the bandwidth (or resources) required by the packet is not available at a switching device in network 110, then that switching device may drop the packet and generate an intention packet. The intention packet may include information from the header of the original packet as well as a severed flag and diagnostic information as shown in FIG. 2b. The switching device may then convey the intention packet to the disk drive though network 110. As noted above, the intention packet may be assured (or nearly assured) of avoiding congestion when being routed to the disk drive by virtue of its relatively small size.

When the intention packet is received at the disk drive, the disk drive may convey a NACK to the host interface to indicate that the packet corresponding to the write request has been dropped. The disk drive may record the information regarding the write request such as the location and the size of the write in a list of severed requests, i.e. requests whose packets were dropped in network 110 where the resent requests have not been received by the disk drive. The disk drive may also perform one or more operations corresponding to the write request, such as prefetching old blocks for a parity computation or flushing a write buffer, in anticipation of receiving a resent request from the host interface.

In one embodiment, when the disk drive receives a non-severed request, i.e. a request that is not a resent request, the disk drive may compare the non-severed request to the list of severed requests. If the non-severed request is independent of each of the severed requests, e.g. attempts to read or write a different region of data than each of the severed requests, then the disk drive may complete an operation corresponding to the non-severed request. If the non-severed request is not independent of one or more of the severed requests, then the disk drive may be configured not to complete the operation corresponding to the non-severed request and may convey a NACK to the host interface that sent the non-severed request. For example, each request may have a sequence number. If a non-severed read request for a location arrives at the disk drive and the severed requests list indicates that a severed write request with an earlier sequence number is pending for the same location, then the non-severed read request will be delayed until the severed write request is resent and completed. However, if the non-severed read request is independent from the requests in the severed requests list, then it will be allowed to complete, even if it arrives out of sequence.

When the host interface receives a NACK from the disk drive, either indicating that its request has been dropped or that its request is not independent of another request that has been severed, the host interface may reschedule the request and may convey a new packet corresponding to the request to the disk drive. The host interface may optimize the rescheduled request in a number of ways. For example, the host interface may reschedule the request at a less congested time. In addition, the host interface may merge the request with a subsequent request while ensuring consistency.

To perform a read request, a host interface may convey a packet corresponding to the read request to the disk drive through network 110. The disk drive may receive the read request packet and may read the data block or blocks specified by the request. The disk drive may then convey the data block or blocks in a response packet to the host interface. If each switching device encountered by the response packet has sufficient resources to transmit the packet, then the response packet may be routed to the host interface to complete the read request. If the resources required by the response packet are not available at a switching device in network 110, then that switching device may drop the response packet and generate an intention packet. The intention packet may include information from the header of the response packet as well as a severed flag and diagnostic information, as shown in FIG. 2b. The switching device may then convey the intention packet to the host interface though network 110. Again, the intention packet may be assured (or nearly assured) of avoiding further congestion to the host interface by virtue of its relatively small size.

Note that in some cases, an adverse condition or combination of adverse conditions may be severe enough so that the intention packet cannot be routed or transmitted to its destination or cannot be routed or transmitted to its destination in a reasonable time. Such cases may be handled for the intention packet by conventional mechanisms, such as a time-out mechanism.

When the host interface receives an intention packet, the host interface may reschedule the read request and may convey a new packet corresponding to the read request to the disk drive. The host interface may optimize the rescheduled request in a number of ways. For example, the host interface may reschedule the request after the disk drive has spun around to the location of the request or it may retarget the read request to a less congested mirror copy. In addition, the host interface may merge the request with a subsequent request while ensuring consistency.

Figure 3:
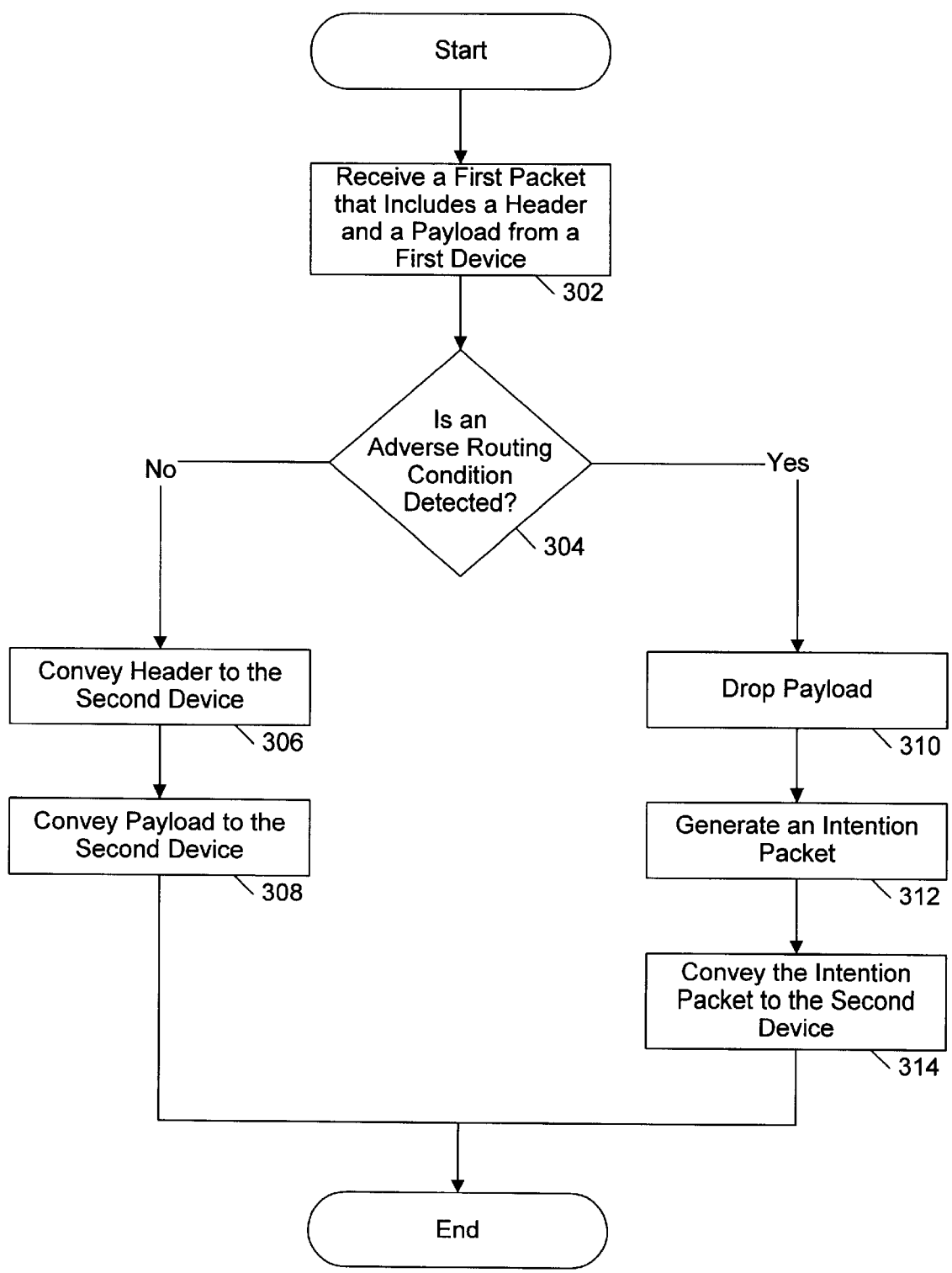
FIG. 3 is a flow chart illustrating one embodiment of a method for implementing an intention packet routing scheme in a switching device.

Turning now to FIG. 3, a flow chart illustrating a method for implementing a routing scheme employing intention packets in a switching device is shown. Variations on the method are possible and contemplated. In FIG. 3, a first packet that includes a header and a payload may be received as indicated in block 302. In block 304, a determination may be made if an adverse routing condition is present. For example, a determination may be made as to whether required routing resources (such as bandwidth and buffering space) are available to transmit the payload to a second device. Other adverse conditions may include packet corruption or a fault condition. If no adverse condition is detected, then the header may be conveyed to the second device as indicated in block 306 and the payload may be conveyed to the second device as indicated in block 308. It can be noted that the header and payload may be conveyed to the second device at substantially the same time or at separate times depending on a routing model used by a system.

If an adverse condition is detected, such as a lack of routing resources, corruption, or fault condition, then the payload may be dropped as indicated in block 310. An intention packet may be generated as indicated in block 312. The intention packet may include all or part of the header of the original packet along with other information as discussed above. The intention packet may be conveyed to the second device as indicated in block 314.

Figure 4:
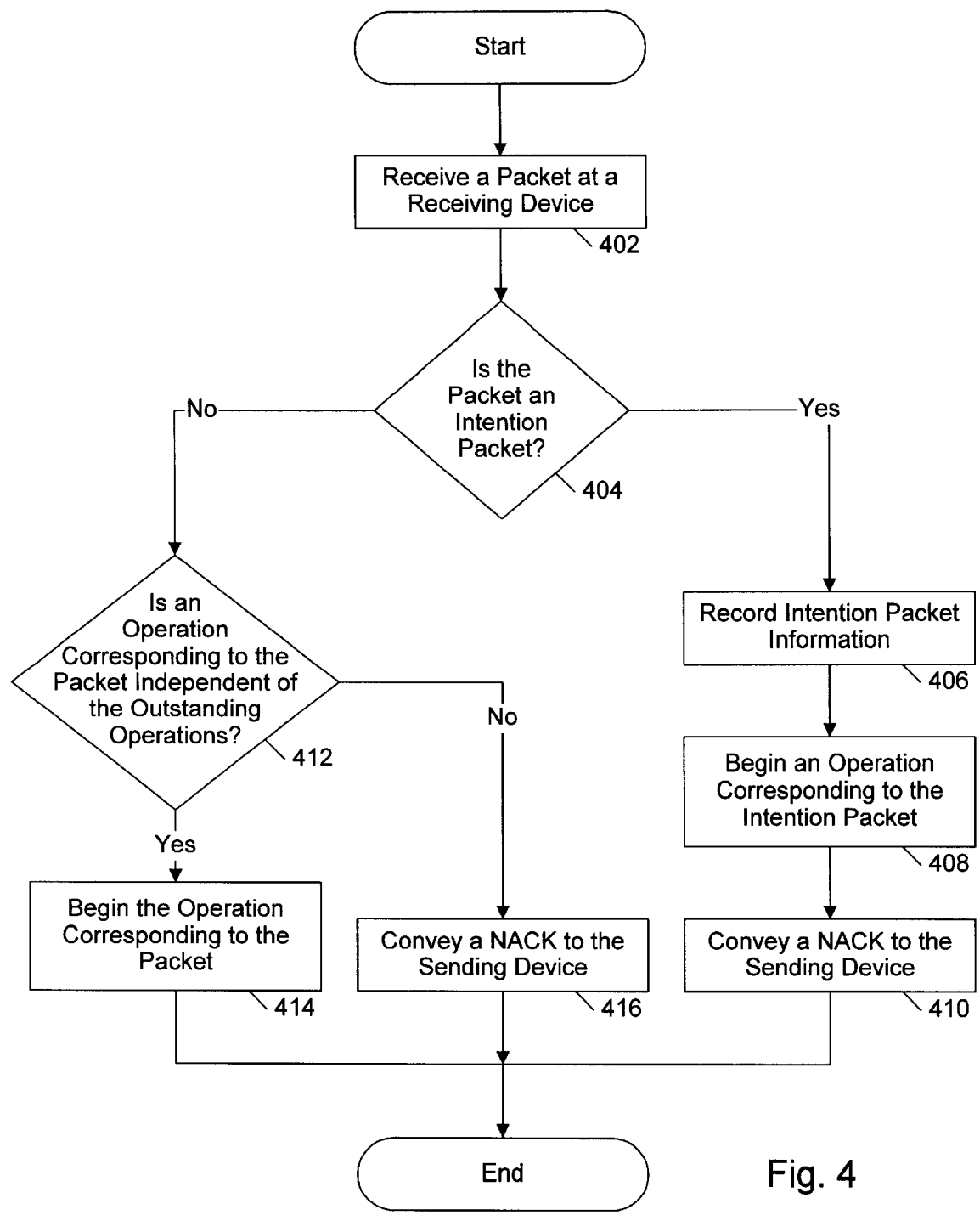
FIG. 4 is a flow chart illustrating one embodiment of a method for handling packets at a first exemplary device.

Turning now to FIG. 4, a flow chart illustrating a method for handling packets at a first exemplary device is shown. The first exemplary device may comprise a disk drive or another type of device. Variations on the method are possible and contemplated. In FIG. 4, a packet may be received at a receiving device as indicated in block 402. In block 404, a determination may be made as to whether the packet is an intention packet. In one embodiment, an intention packet may include a flag to indicate that it is an intention packet. If the packet is an intention packet, then intention packet information may be recorded as indicated in block 406. In addition, an operation corresponding to the intention packet may be begun as indicated in block 408, such as prefetching data blocks or flushing a write buffer. A NACK may be conveyed to the sending device as indicated in block 410. Note that the elements of the method indicated at 408 and 410 do not necessarily occur serially. Element 410 may be performed before 408, after 408 or concurrently with 408.

If the packet is not an intention packet, then a determination may be made as to whether an operation corresponding to the packet is independent of an outstanding operation as indicated in block 412. The outstanding operation may correspond to other intention packets that were received at the receiving device prior to the packet. If the operation corresponding to the packet is independent of the outstanding operations, or alternatively, if there are no outstanding operations at the receiving device, then the operation corresponding to the packet may be begun as indicated in block 414. If the operation corresponding to the packet is not independent of the outstanding operations, then a NACK may be conveyed to the sending device as indicated in block 416. In addition, the operation corresponding to the packet may not be performed.

Figure 5:
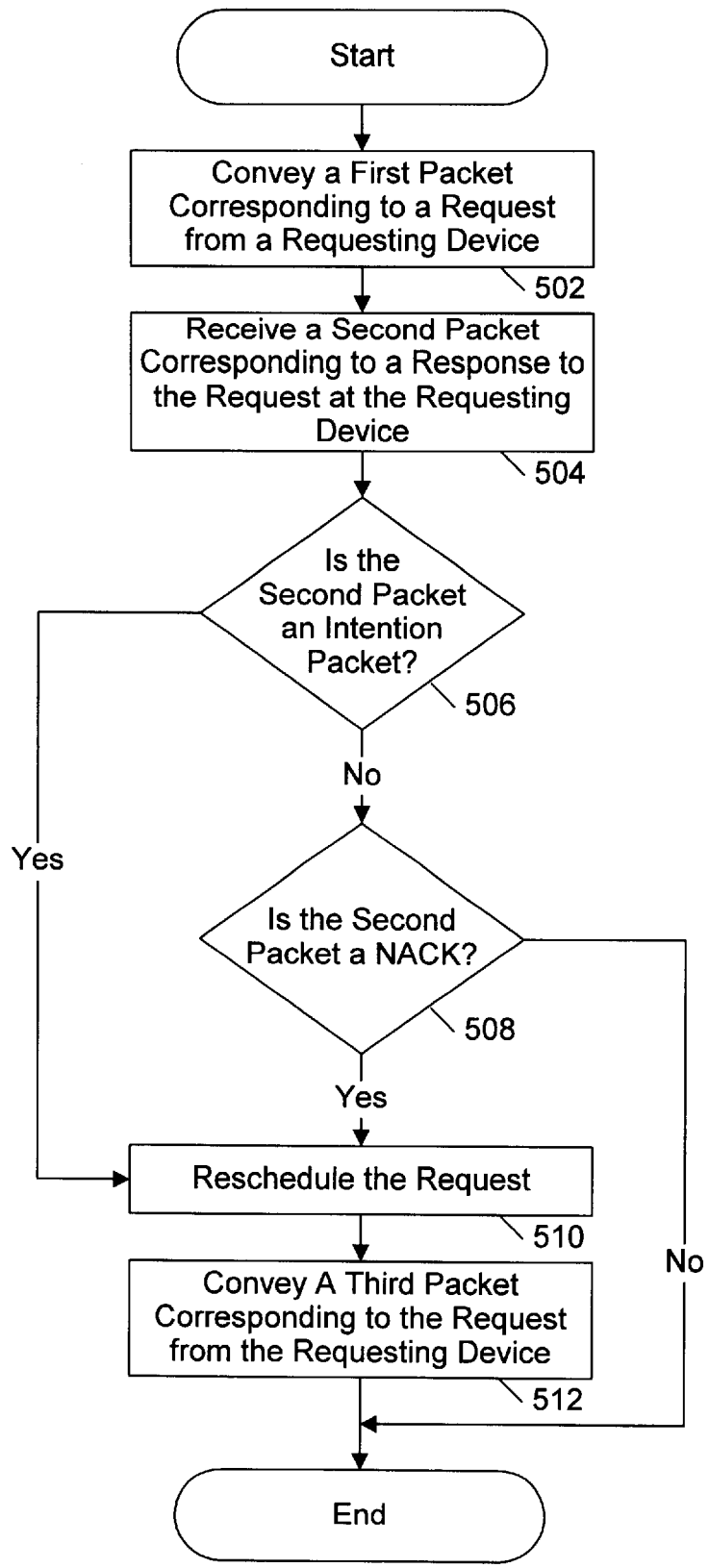
FIG. 5 is a flow chart illustrating one embodiment of a method for handling packets at a second exemplary device.

Turning now to FIG. 5, a flow chart illustrating a method for handling packets at a second exemplary device is shown. The second exemplary device may comprise a host interface or another type of device. Variations on the method are possible and contemplated. In FIG. 5, a first packet corresponding to a request from a requesting device may be conveyed as indicated in block 502. A second packet corresponding to a response to the request may be received at the requesting device as indicated in block 504. In block 506, a determination may be made as to whether the second packet is an intention packet. In addition, a determination may be made as to whether the second packet is a NACK as indicated in block 508. If the second packet is either an intention packet or a NACK, then the request may be rescheduled as indicated in block 510 and a third packet corresponding to the request may be conveyed from the requesting device as indicated in block 512.

It can be noted that the requesting device may receive an intention packet when the response to its request was dropped in route to the requesting device. The response, for example, may have included data corresponding to a read request from the requesting device. It can be further noted that the requesting device may receive a NACK when its request was not independent of an outstanding request at a receiving device.

Figure 6:
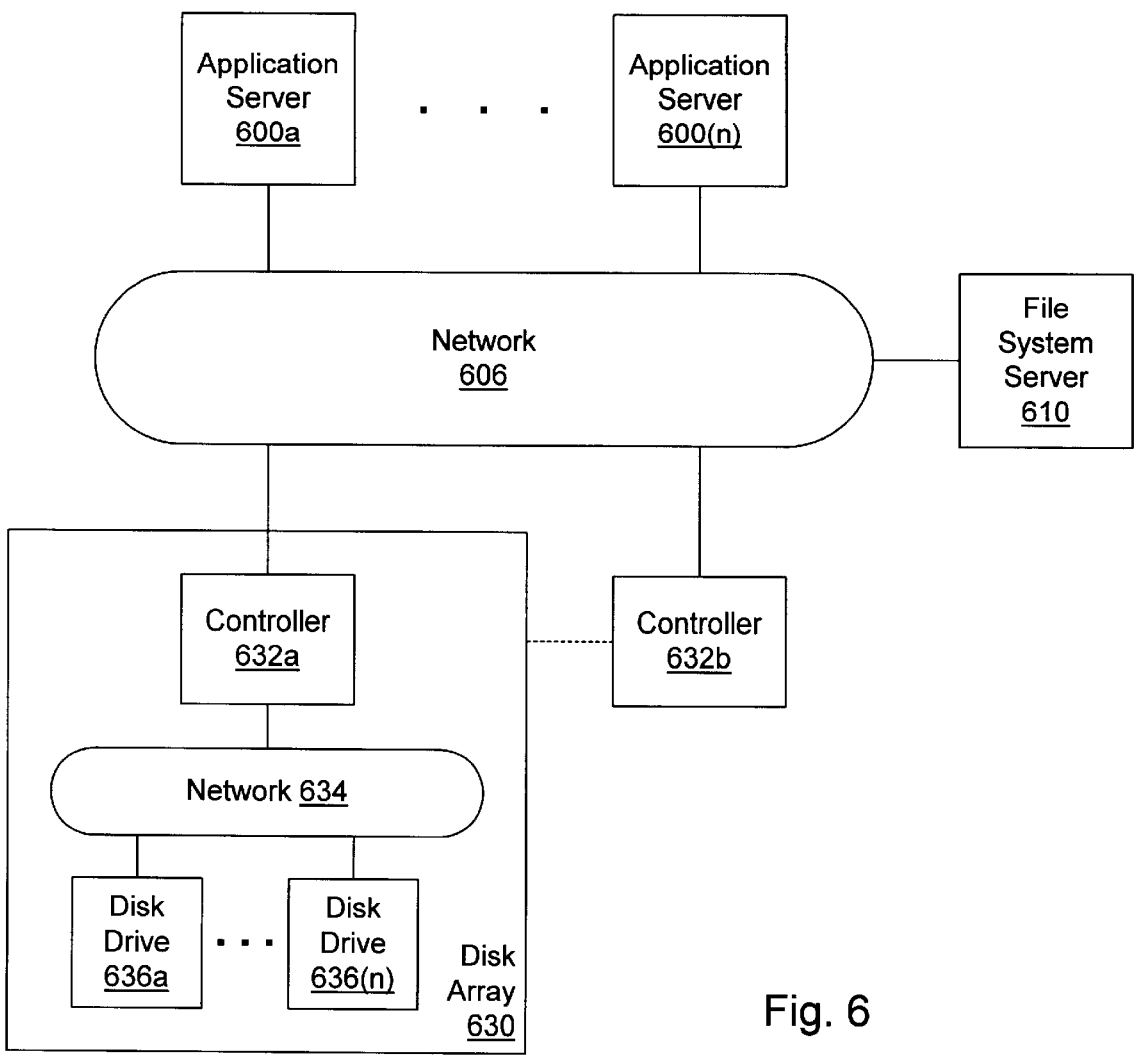
FIG. 6 is a block diagram of one embodiment of a system including a hierarchy of networks.

Turning now to FIG. 6, a block diagram of one embodiment of a system is shown. FIG. 6 depicts a plurality of application servers 600a through 600(n) (collectively, application servers 600), file system server 610, and disk array 630 coupled to a network 606. Disk array 630 includes controller 632a and a plurality of disk drives 636a through 636(n) (collectively, disk drives 636) coupled to network 634. In addition, controller 632b is coupled to network 606 and disk array 630.

The embodiment of FIG. 6 may be configured to implement the routing scheme discussed above with respect to FIGS. 1–5. In particular, controller 632a and controller 632b may each operate as a host interface to network 606 and may perform accesses to disk drives 636 on behalf of application servers 600 and file system server 610. Controller 632a and controller 632b may convey packets to and receive packets from the disk drives 636 through network 634. In response to congestion or other adverse conditions at a switching device in network 634, a packet may be dropped and an intention packet may be generated as discussed above. The intention packet mechanism may also be applied to network 606.

In one embodiment, networks 606 and 634 may be viewed as a hierarchy of networks in which the intention packet routing mechanism described above in regard to FIGS. 1–5 may be applied to each network level of the hierarchy. For example, a device on network 606, such as file system server 610, may issue a request packet on network 606. The request may be for data stored on one of disk drives 636 in disk array 630. The destination for the request may thus be controller 632a, which is a device common to both network 606 and network 634. As the request packet is routed on network 606 to controller 632a, if an adverse routing condition is encountered then the intention packet mechanism as described above may be applied. When controller 632a receives the request or an intention packet it may generate a packet onto network 634 targeted to one of the disk drives 636. For example, if the request was a read request, then controller 632a may generate a corresponding read request packet on network 634 to the appropriate disk drive 636. Again the intention packet mechanism may be applied on network 634 if an adverse routing condition is encountered. Once the targeted disk drive responds to the read request, it conveys a response packet on network 634 which may again involve the intention packet mechanism described above. When the response is received by controller 632a, it may repackage the response as a response packet on to network 634 in response to the original request from file system server 610.

In the example above, if controller 632a received an intention packet corresponding to the request from file system server 610 instead of receiving the request itself, controller 632 as may still generate a request on network 634 in preparation for, or in anticipation of, receiving a resent request from file system server 610. The intention packet mechanism described above in regard to FIGS. 1–5 may be applied for multiple levels of a network hierarchy, such as network 606 and network 634 in FIG. 6. The intention packet mechanism may be applied to requests or responses originating in any level of the network hierarchy. Note that in the example of FIG. 6, the controller 632a is an example of a device that is shared by two levels of the network hierarchy. Devices on network 606, such as application server 600 or file system server 610, are not necessarily aware of the existence of network 634. To other devices on network 606, the network topology of disk array 630 may appear as a single node or device within the network topology for network 606.

Figure 7:
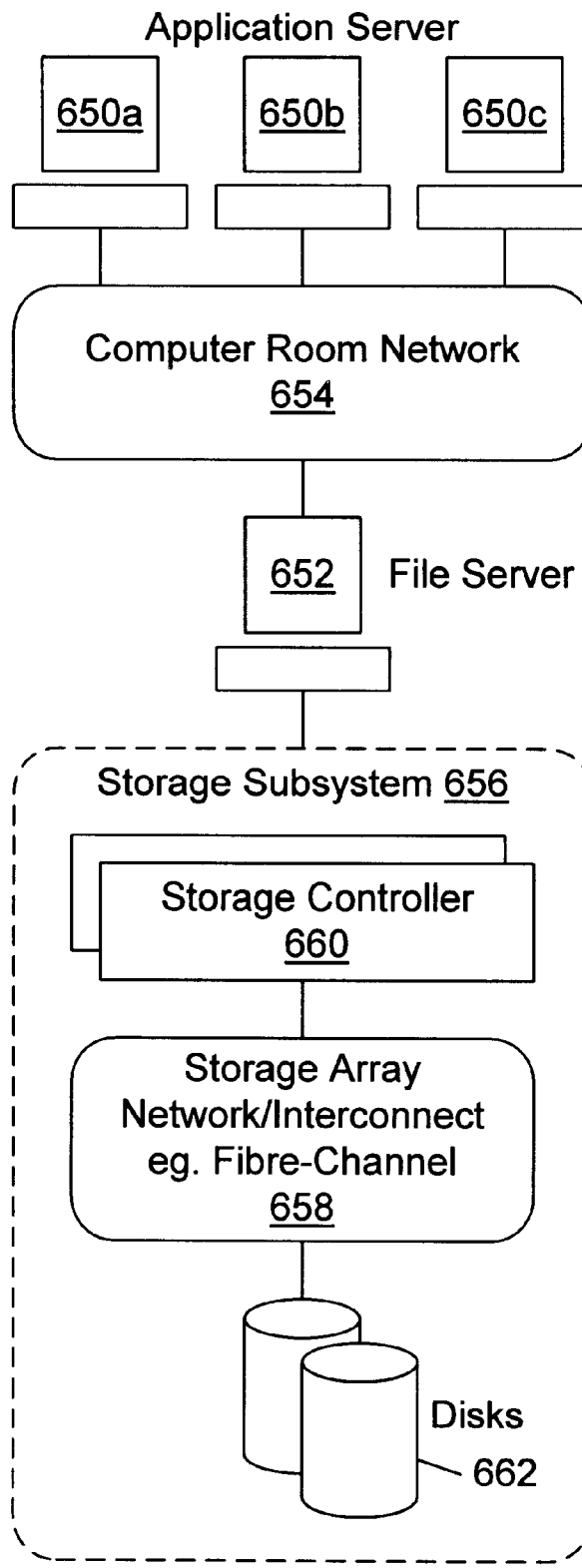
FIG. 7 illustrates another example for one embodiment of hierarchically applying an intention packet mechanism.

FIG. 7 illustrates another example of hierarchically applying the intention packet technique described above. An application server 650a, 650b or 650c may send a write-file request to a file server 652. Some switching device in the computer room network 654 may encounter an impairment or adverse condition, such as a congestion, and may be forced to drop the payload of the request.

In that scenario, the switching device may generate an intention packet to be delivered to the file server 652. The file server 652, based on the intention, may deduce that, for example, certain blocks in a RAID-5 stripe will be updated imminently when a retransmitted write-file request subsequently arrives, and thus may decide to prefetch the data blocks that may be needed for recomputing the RAID parity for the stripe when the write-file blocks are updated.

Concurrently, within a storage subsystem 656 coupled to the file server 652, a lower-level intention scheme may also be implemented. At this level, some switching device in storage array interconnection 658 for storage subsystem 656 may encounter an impairment or adverse condition, such as a parity error, and may be forced to discard the payload of a write-block message (which may be caused by the file server 652 in response to a subsequently successful write-file request, for example) from the storage controller 660 to one of the disks 662 in the storage subsystem 656.

In this scenario, the switching device in storage interconnect 658 may generate a low-level intention packet to be delivered to the disk 662. This intention packet may provide a hint which causes, for example, the disk to flush its cache in order to make room for the anticipate data, or to move the write-head to the appropriate location on the disk where the write-block will eventually take place.

Such hierarchical application of the intention packet technique may also be employed in other network, switching or routing environments.

Figure 8:
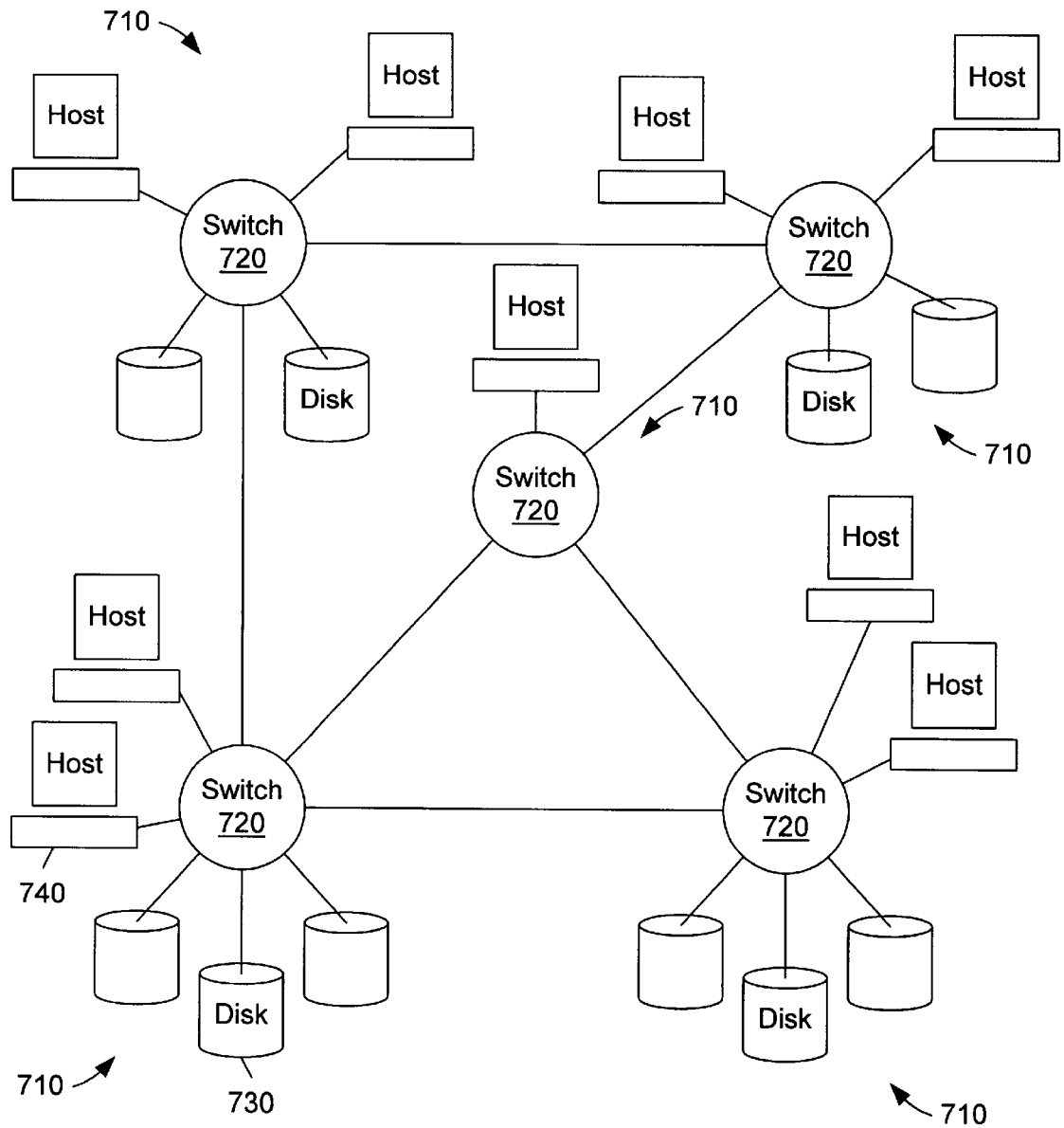
FIG. 8 is a block diagram of one embodiment of a plurality of nodes connected in a network.

Turning now to FIG. 8, a block diagram of one embodiment of a network topology including a plurality of nodes connected in by a network is shown. Any number of nodes 710 may be included in the network. In the embodiment of FIG. 8, each node 710 may include a switching device 720. Nodes 710 may also include one or more devices such as a disk drive 730 or local host (e.g. computing) system 740. In other embodiments, each node 710 may include other types or numbers of devices and the nodes 710 may not be identical. The above-described routing mechanism employing intention packets may be applied to the system of FIG. 8. For example, a device at one node may initiate a request to a device at another node, such as from one host system to another or from a host system to a disk drive. A request may be routed from one node to another through several of the switching devices. If routing problems are encountered, the above-described intention packet routing mechanism may be employed.

Each node 710 may include its own network topology to which the above-described routing mechanism employing intention packets may be applied. Also, each device in one of the node 710, such as host system 740 or disk drive 730 may include another network topology. For example, one of the disk drives 730 may be a networked disk array such as disk array 630 in FIG. 6. Thus, the above-described routing mechanism employing intention packets may be applied to a hierarchy of network topologies.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 110 and/or a wireless link.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

I claim:

1. A system, comprising:
   a first network topology comprising:
      a first plurality of devices; and
      a first network coupled to said first plurality of devices, said first network configured to route first packets between said first plurality of devices, wherein in response to an adverse transmission condition, said first network is configured to drop at least a portion of one of said first packets that encountered the adverse transmission condition, generate an intention packet, and convey said intention packet to one of said first plurality of devices that was a destination for the one of said first packets that encountered the adverse transmission condition, wherein said intention packet includes information about the one of said packets that encountered the adverse transmission condition; and
   a second network topology comprising:
      a second plurality of devices; and
      a second network coupled to said second plurality of devices, said second network configured to route second packets between said second plurality of devices, wherein in response to an adverse transmission condition, said second network is configured to drop at least a portion of one of said second packets that encountered the adverse transmission condition, generate an intention packet, and convey said intention packet to one of said second plurality of devices that was a destination for the one of said second packets that encountered the adverse transmission condition, wherein said intention packet includes information about the one of said packets that encountered the adverse transmission condition; and
   wherein said first plurality of devices and said second plurality of devices comprise a common device, wherein said common device is configured to receive one of said first packets from said first network, and in response to receiving said one of said first packets convey one of said second packets onto said second network.

2. The system of claim 1, wherein the one of said first packets that encountered the adverse transmission condition includes a header and a payload, and wherein said first network is configured to drop said payload and generate said intention packet from at least a portion of said header.

3. The system of claim 1, wherein said intention packet generated by said first network includes a flag indicating that at least a portion of the one of said first packets that encountered the adverse transmission condition has been dropped.

4. The system of claim 1, wherein said destination device for the one of said first packets that encountered the adverse transmission condition is configured to convey a negative acknowledgement packet to said first device in response to receiving said intention packet.

5. The system of claim 4, wherein the one of said first packets that encountered the adverse transmission condition corresponds to a request, and wherein one of said first plurality of devices that is a sending device of the request is configured to reschedule said request in response to receiving said negative acknowledgement.

6. The system of claim 4, wherein said destination device for the one of said first packets that encountered the adverse transmission condition is configured to perform a first operation corresponding to a request indicated by said intention packet in response to receiving said intention packet.

7. The system of claim 1, wherein the one of said first packets that encountered the adverse transmission condition corresponds to a response to a request, wherein said destination device for the one of said first packets that encountered the adverse transmission condition is configured to reschedule said request in response to receiving said intention packet.

8. The system of claim 1, wherein said common device comprises a host interface, and wherein said second plurality of devices comprises a plurality of disk drives.

9. The system of claim 1, wherein said adverse transmission condition in said first or second network comprises congestion above a threshold at said first or second network is configured to convey the packet encountering the congestion.

10. The system of claim 1, wherein said adverse transmission condition in said first or second network comprises corruption of a packet.

11. The system of claim 1, wherein said adverse transmission condition in said first or second network comprises a fault condition preventing routing of a first packet along an intended route.

12. A method comprising:

receiving a first packet from a first device in a first network;

determining if an adverse transmission condition is present in said first network;

if an adverse transmission condition is present in said first network, dropping at least part of said first packet, generating a second packet, wherein said second packet includes information about said first packet, and conveying said second packet to a second device;

if an adverse transmission condition is not present in said first network, conveying said first packet to said second device;

said second device conveying a third packet onto a second network;

determining if an adverse transmission condition is present in said second network; and if an adverse transmission condition is present in said second network, dropping at least part of said third packet, generating a fourth packet, wherein said second packet includes information about said third packet, and conveying said fourth packet to a third device on said second network.

13. The method of claim 12, wherein said first packet includes a header and a payload, wherein said dropping at least a part of said first packet comprises dropping said payload, and wherein said generating a second packet comprises converting said header into a severed header.

14. The method of claim 12, wherein said generating a second packet comprises generating a flag that indicates that at least part of said first packet has been dropped.

15. The method of claim 12, further comprising said second device conveying a negative acknowledgement to said first device in response to receiving said second packet.

16. The method of claim 15, further comprising said first device rescheduling a request in response to receiving said negative acknowledgement, wherein said first packet corresponds to said request.

17. The method of claim 16, wherein said second device conveys said third packet onto said second network in response to receiving said second packet, wherein said third packet corresponds to an operation to prepare for said request.

18. The method of claim 12, wherein said second device conveys said third packet onto said second network in response to receiving said first packet.

19. The method of claim 12, wherein said second device comprises a host interface, and wherein said third device on said second network comprises a disk drive.

20. The method of claim 12, wherein said adverse transmission condition comprises congestion above a threshold.

21. The method of claim 12, wherein said adverse transmission condition comprises corruption of said first packet.

22. The method of claim 12, wherein said adverse transmission condition comprises a fault condition preventing routing of a packet along an intended route.

* * * * *

UNITED STATES PATENT AND TRADEMARK OFFICE
CERTIFICATE OF CORRECTION

PATENT NO.    : 6,741,561 B1
DATED         : May 25, 2004
INVENTOR(S)   : Whay S. Lee It is certified that error appears in the above-identified patent and that said Letters Patent is hereby corrected as shown below:

Title page,
Item [54], Title, please delete the current title and insert -- ROUTING MECHANISM USING INTENTION PACKETS IN A HIERARCHY OF NETWORKS -- in place thereof.

Signed and Sealed this

Twenty-seventh Day of July, 2004

JON W. DUDAS
*Acting Director of the United States Patent and Trademark Office*